(12) United States Patent
Leboeuf et al.

(10) Patent No.: US 6,945,124 B1
(45) Date of Patent: Sep. 20, 2005

(54) MEASUREMENT SYSTEM

(75) Inventors: Pierre Leboeuf, Richelleu (CA); Nicolas Gauthier, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 10/969,941

(22) Filed: Oct. 22, 2004

(51) Int. Cl.[7] ............................................ G01F 1/28
(52) U.S. Cl. ............................................ 73/861.74
(58) Field of Search ................... 73/861.74, 861.71; 356/376, 1

(56) References Cited

U.S. PATENT DOCUMENTS

| | | | |
|---|---|---|---|
| 4,222,172 A | 9/1980 | Mason | |
| 4,582,426 A | 4/1986 | Douglas | |
| 4,875,777 A | 10/1989 | Harding | |
| 4,983,043 A | 1/1991 | Harding | |
| 5,291,270 A * | 3/1994 | Koch et al. | 356/602 |
| 5,307,150 A * | 4/1994 | Lecerf et al. | 356/601 |
| 5,517,310 A | 5/1996 | Paquette | |
| 6,094,269 A | 7/2000 | Ben-Dove et al. | |
| 6,148,677 A | 11/2000 | Evangelista | |
| 6,730,927 B1 * | 5/2004 | Smith et al. | 250/573 |
| 2004/0239948 A1 | 12/2004 | Harding et al. | |

FOREIGN PATENT DOCUMENTS

| | | |
|---|---|---|
| JP | 61176806 | 8/1986 |
| JP | 62182604 | 8/1987 |
| JP | 05087534 | 4/1993 |

OTHER PUBLICATIONS

U.S. Appl. No. 10/969,935, Leboeuf et al.

* cited by examiner

*Primary Examiner*—Edward Lefkowitz
*Assistant Examiner*—Jewel Thompson
(74) *Attorney, Agent, or Firm*—Ogilvy Renault LLP

(57) ABSTRACT

A device and method for measuring an area such as a throat area in a vane ring for gas turbine engines. Measurement inaccuracy introduced by image size changes as a result of the position deviation of the selected throat relative to a desired datum is reduced as a result of the improved system disclosed.

16 Claims, 4 Drawing Sheets

MEASUREMENT SYSTEM

FIELD OF THE INVENTION

The present invention relates to a system of measuring an area such as a throat area of a vane ring for a gas turbine engine.

BACKGROUND OF THE INVENTION

In order to fine tune the desired flow area through a gas turbine vane ring, adjustments are typically made to the trailing edge of the vane blades. The minimum flow area controls the pressure ratio of the turbine and the mass flow of the engine, and therefore affects the compressor's running line. These adjustments may involve simply bending the trailing edge of a stator vane, cutting back the trailing edge or in the case of a segmented vane ring, vane segment replacement. In order to calibrate the stator ring relative to the gas turbine engine, the flow area of the stator must be determined and is a critical procedure for achieving optimum engine performance as well as optimum efficiency and energy consumption. This requires that the flow area through the vane ring be measured.

Conventionally, the flow area of a stator ring can be determined by use of a flow rig which permits the flow area to be derived from the pressure drop measured across the vane ring. Another conventional method of determining the flow area of a stator ring involves mechanically measuring the dimensions of the throat area.

SUMMARY OF THE INVENTION

It is one object of the present invention to provide an improved measurement of critical parameters for gas turbine engines.

In accordance with one aspect of the invention, there is provided a device for measuring a throat area of a gas turbine vane ring, the vane ring having an annular array of vanes defining a plurality of individual throats between adjacent vanes of the array, the device comprising an area-determining assembly including at least one primary radiation source for projecting radiation onto a subject vane ring, at least a first radiation detector for sensing radiation originating from the radiation detector which is indicative of throat area, and a processor for determining throat area from said sensed radiation; and a position correction assembly including a position sensor for detecting a present position of the subject vane ring, a comparison apparatus adapted to determine a difference between the present position and a desired reference position, and a correction apparatus adapted to correct the area determined by the area-determining assembly based on any said difference receiving from the comparison apparatus.

In accordance with another aspect of the invention, there is provided a method of measuring a throat area in a gas turbine vane ring, the vane ring having an annular array of varies defining a plurality of individual throats between adjacent vanes, the method comprising directing radiation towards the vane ring; capturing some of said radiation to thereby provide an image of a throat area of the vane ring; analyzing the image to determine dimensional data regarding the size of the image; determining any difference existing between a present position of the throat and a desired reference position of the throat; and using any said difference existing between the present and reference positions to improve the accuracy of the dimensional data.

In accordance with a still further aspect of the present invention, there is provided a device for measuring a throat area in a vane ring for gas turbine engines, the vane ring having an annular array of vanes defining a plurality of individual throats between adjacent leading and following vanes of the array, the device comprising at least one lighting source positioned for lighting a subject vane ring to thereby cast light and shadow to delineate a selected throat of the subject vane; a light detector including a telecentric lens, the light detector being positioned to capture an image of the selected throat through the telecentric lens system; and a processor for analyzing the image to determine an area of the image.

The present invention also provides a device for measuring throat area of a gas turbine vane ring, the vane ring having an annular array of vanes defining a plurality of individual throats between adjacent vanes of the array, the device comprising a primary light source disposed in a throat defining position wherein an area of shadow is cast by said primary radiation light on the vane ring initiating in the plane of the selected throat, said area of shadow being surrounded by an area of reflectance to thereby delineate a throat; a camera for capturing an image of the throat, said image comprising at least said shadow and said area of reflectance; an image analyzer for determining from a dark portion of the image dimensional data proportional to a throat area of the selected throat; a second camera for determining a present position of the vane ring; a position comparator for comparing the measured present position to a desired reference position; and adjustment means for adjusting an output measurement of the device to correct for any difference between the measured present position to a desired reference position.

The present invention advantageously improves the accuracy of the measurement of the throat area of a vane ring for gas turbine engines by eliminating or minimizing the changes of dimensional data of the image when the position of the selected throat being measured, changes due to the manufacturing tolerances of the vane ring and other causes.

Other features and advantages of the present invention will be better understood with reference to the preferred embodiments described hereinafter.

BRIEF DESCRIPTION OF THE DRAWINGS

Reference will now be made to the accompanying drawings, showing by way of illustration preferred embodiments of the present invention, in which.

DETAILED DESCRIPTION OF THE PREFERRED EMBODIMENT

A measuring method and device for gas turbine engines is described in the applicant's co-pending U.S. patent application Ser. No. 10/270,506, the contents of which are incorporated herein by reference. The present invention will be described with reference to the use of such measurement system in measuring a vane ring throat area (i.e. the area subtended by adjacent vane airfoils and the inner and outer stator platforms), however the skilled reader will appreciate that the present invention has application beyond the examples described.

Figure 1:
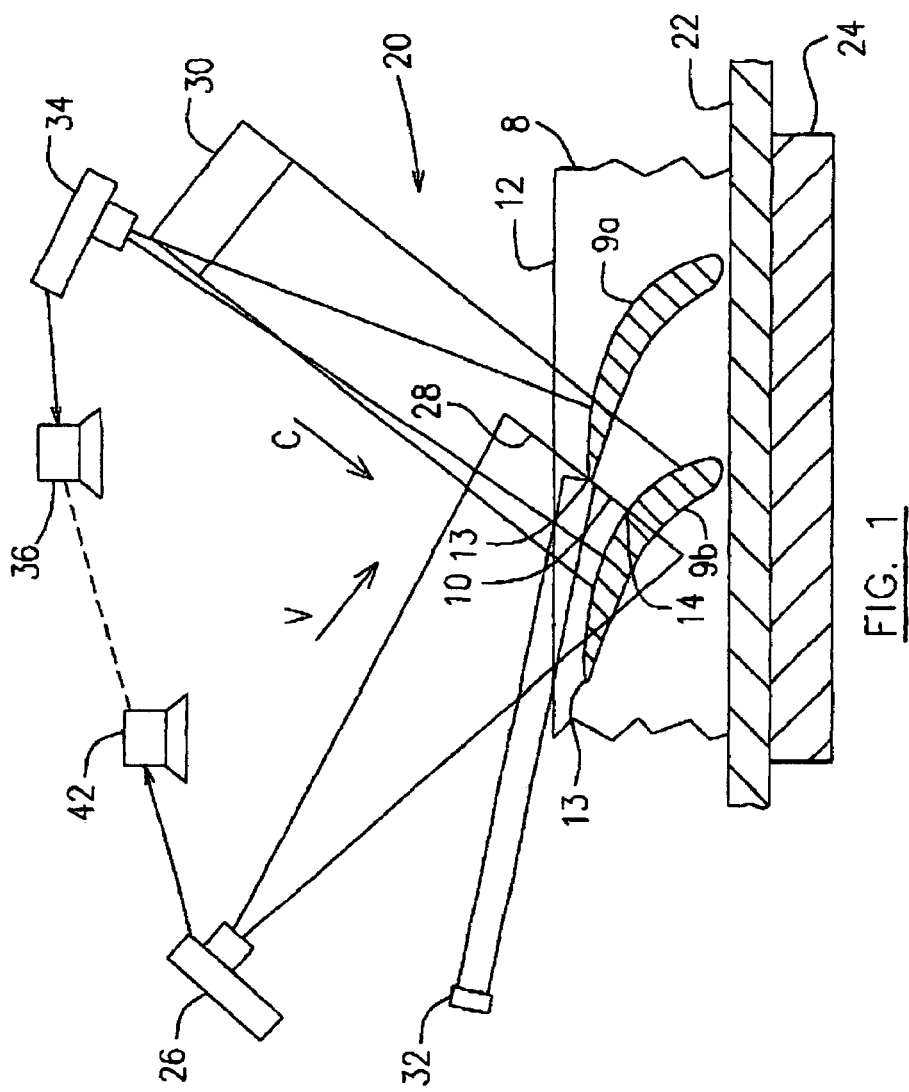
FIG. 1 is an elevational sectional view of a device according to one embodiment of the present invention, showing a partial cross-sectional view through the stator vane mounted on a rotary fixture.

Referring to FIG. 1, a vane ring 8 has an annular array of stator vanes 9 (only two of which, vanes 9a and 9b, are depicted in this Figure), with each adjacent vane pair defining a plurality of throats or vacant areas 10 therebetween. For the purposes of this application, each individual throat 10 is defined as a planar area or opening with a periphery bounded in a radial direction (relative to the annular array of vanes) by an inner vane shroud 11 (see FIG. 2) and an outer vane shroud 12 and in the circumferential direction (relative to the annular array of vanes) by the trailing edges 13 of the first vane 9a and the convex side surface of the following or second vane 9b immediately adjacent the trailing edge of vane 9a, which position is here depicted and described as a line 14 extending from the trailing edge of vane 9a to the convex surface of the following or second vane 9b.

Referring still to FIG. 1, a device for measuring the area of throat 10 of the vane ring 8, in accordance with one embodiment of the present invention, is generally indicated by numeral 20. The system is described in detail in the incorporated reference co-pending application Ser. No. 10/270,506, and thus need only be described briefly here. A fixture 22, preferably with a rotary indexing table 24, supports the vane ring 8 for progressive rotation so that a radiation detector 26, such as an optical or digital camera or other radiation sensor, is able to view and capture an image of the plurality of throats 10 between the adjacent vanes 9 of the ring 10. A first processor 42 is provided to analyze the data to determine a composite indicative of the actual throat area of the vane ring 8.

The vane ring 8 is placed on the fixture 22 in an imaging position such that the periphery of a selected individual throat 10 is within an measuring field of view 28 of detector 26. The measuring field of view 28 is preferably a rectangular plane superposed on the plane of the selected throat 10, which is normal to the plane of the page in FIG. 1. However, it will be understood that any shape of the field of view may be used and multiple detectors 26 may be employed. Detectors 26 may each measure a defined portion of the throat area which is then summed to acquire a total, or each detector 26 may measure the entire throat and the results are averaged to improve accuracy.

The device 20 further includes at least one primary radiation source 30, such as a primary lighting source in this embodiment, which is disposed in a throat defining position in order to cast an area of shadow on the vane ring 8, initiated in the plane of the selected throat 10. The area of shadow is surrounded by and contrasted with an area of reflection wherein the light from the primary radiation source 30 is reflected by the vane ring 8, thereby visually delineating the throat area of the selected throat 10 of the vane ring 8.

The device 20 of this embodiment preferably further includes a auxiliary radiation source 32, for example an auxiliary lighting source which is positioned to illuminate the trailing edge 13 of the leading vane 9a, in order to provide a superior delineation of the area to be measured. Preferably, the primary and auxiliary lighting sources 30, 32 are collimated to ensure a sharp definition (i.e. interface between light and shadow) of the area to be measured.

Although lighting sources 30, 32 are used in this embodiment for primary and auxiliary radiation sources, for safety and ease of use, a light spectrum is preferred and may be chosen from visible light, infrared light or ultraviolet light, to equal advantage. Lasers may also be used. However, the radiation sources can be of any known radiation type for purposes of the present invention.

In the embodiment illustrated in FIG. 1, the viewing or detection direction of the detector 26, indicated by the arrow V, is shown as being substantially perpendicular to the plane of the selected throat 10. The preferred viewing direction V is from slightly above a perpendicular orientation in order to more precisely define the lower boundary of the area of shadow (along line 14).

Data acquired by the detector 26 is analyzed, for example by pixel counting, to determine dimensional data for the dark portion of the image, which is related to the individual throat area of the selected throat 10. The analysis of the image is conducted by the first processor 42. Instead of pixel counting, the area of the image may be determined by any suitable technique or algorithm.

Where an accurate composite throat area for vane ring 8 is required, the detector 26 is used to progressively acquire data from each of the individual throats 10 around the vane ring, and the first processor 42 analyzes the data to acquire a total throat area for the entire vane ring 8.

The device 20 is preferably initially calibrated by use of a master vane of known area placed at a reference position relative to the detector 26 to establish calibration metrics against which measured values are compared in order to determine the actual vane throat area.

As will be appreciated by the skilled reader, the calibration established is based, at least in part, on a reference position of the detector 26 relative to the area/subject to be measured. If the actual distance between sensor and subject is different, measurement accuracy will be affected, as the subject size will erroneously seem larger or smaller based on the data collected by the sensor system. The inventors have found, for example, that the inherent manufacturing tolerances present in a vane ring assembly (which can be in the range of 0.030 inches) can be sufficient to appreciably affect the accuracy of the measurement of device 20. Therefore, in the present invention the device 20 further includes a position detector 34, for example, a position sensor such as another camera, to more precisely determine the distance between the camera 26 and the plane of the selected throat 10 so that positional deviations can be accounted for, either by repositioning of the subject or detector 26 (or both), or in the processor's calculations. It should be noted that any suitable position sensor, such as a laser, mechanical devices, etc., may be used although in this embodiment a second camera is the preferred position sensor.

The camera/sensor 34 is preferably positioned to have a view direction indicated by arrow C, substantially parallel to the plane of the selected throat 10 which is in the field of view 28 of the detector 26. Thus, the horizontal and vertical distances and/or misalignment angles existing between the actual and desired reference plane for the selected throat 10 and the detector 26 will appear in data acquired by the sensor 34. For example, the camera can acquire data on the present position of the throat which will then permit a deviation from the desired reference position to be calculated by a second processor 36. (Processors 42 and 36 may indeed be the same processor equipment or software if desired, but are separated here for clarity). The deviation information determined can then be used directly for adjustment of the horizontal, vertical and angular position, e.g. by adjusting the position/angle of the detector 26 or the position/angle of the vane ring 8, or may be used by the processor(s) to "virtually adjust" the acquired measurement data as needed to achieve an accurate (i.e. calibrated) final result. Preferably, the vane ring position is simply adjusted, as this is believed to be the simplest approach, and the preferred goal is to bring the trailing edge 13 of vane 9a to a predetermined reference position relative to the measuring apparatus to reduce measurement inaccuracies. This helps ensure that the trailing edge 13 of vane 9a, and thus the throat 10, is parallel to the imaging plane of the measuring apparatus, an exact predetermined distance from the imaging plane, and perpendicular thereto to reduce any perspective-related distortion which may occur at the imaging plane. The fixture 22 and the rotary indexing table 24 preferably include means for controlling a fine adjustment of the vane ring 8 position such that the relative positions of the detector 26 and each selected throat 10 of the vane ring 8 can be adjusted as closely as possible to the desired reference distance.

Preferably, fine adjustment is performed as will now be described. The vane ring 8 is rotated to bring the trailing edge 10 of vane 9a into the measurement plane, with the aid of position sensor 34 (i.e. angular alignment is first achieved). Using information acquired by the detector 26, processor 42 computes the horizontal and vertical difference between the actual and desired reference position of the trailing edge of vane 9a, and thus the vane assembly, and a corresponding movement (of measurement apparatus or vane assembly, or both) is made to achieve horizontal and vertical alignment in the desired predetermined positions. Any relevant environmental factors are then acquired (e.g. ambient lighting, when a light-based system is used) and measurement parameters adjusted accordingly, if necessary (e.g. light intensity, camera settings, etc.) and the image data is then acquired and analyzed.

In an alternative approach, as mentioned briefly above, the dimensional data of the position deviation of the plane of the selected throat 10 (i.e. between present and reference) is used, for example as a scaling factor, in the calculation of the area based on the dimensional data of the throat area acquired by detector 26, thereby compensating mathematically for the positional deviation of the throat 10, to thereby yield a calibrated result.

In accordance with another embodiment of the present invention, the a second radiation detector, such as another camera, is provided spaced apart from the first detector for acquiring data from the selected throat 10 at different angles, to thereby provide stereoscopic data from which positional deviation data may be derived (e.g. by triangulation). For example, and as illustrated in FIG. 2, a first detector 26a (a camera is preferred) is positioned in one throat defining position for capturing the image of the selected throat 10 at a first angle (not indicated) with respect to the plane of the selected throat 10, and a second detector 26b is positioned for capturing the image of the selected throat 10 at a second angle (not indicated) with respect to the plane of the selected throat 10.

Figure 2:
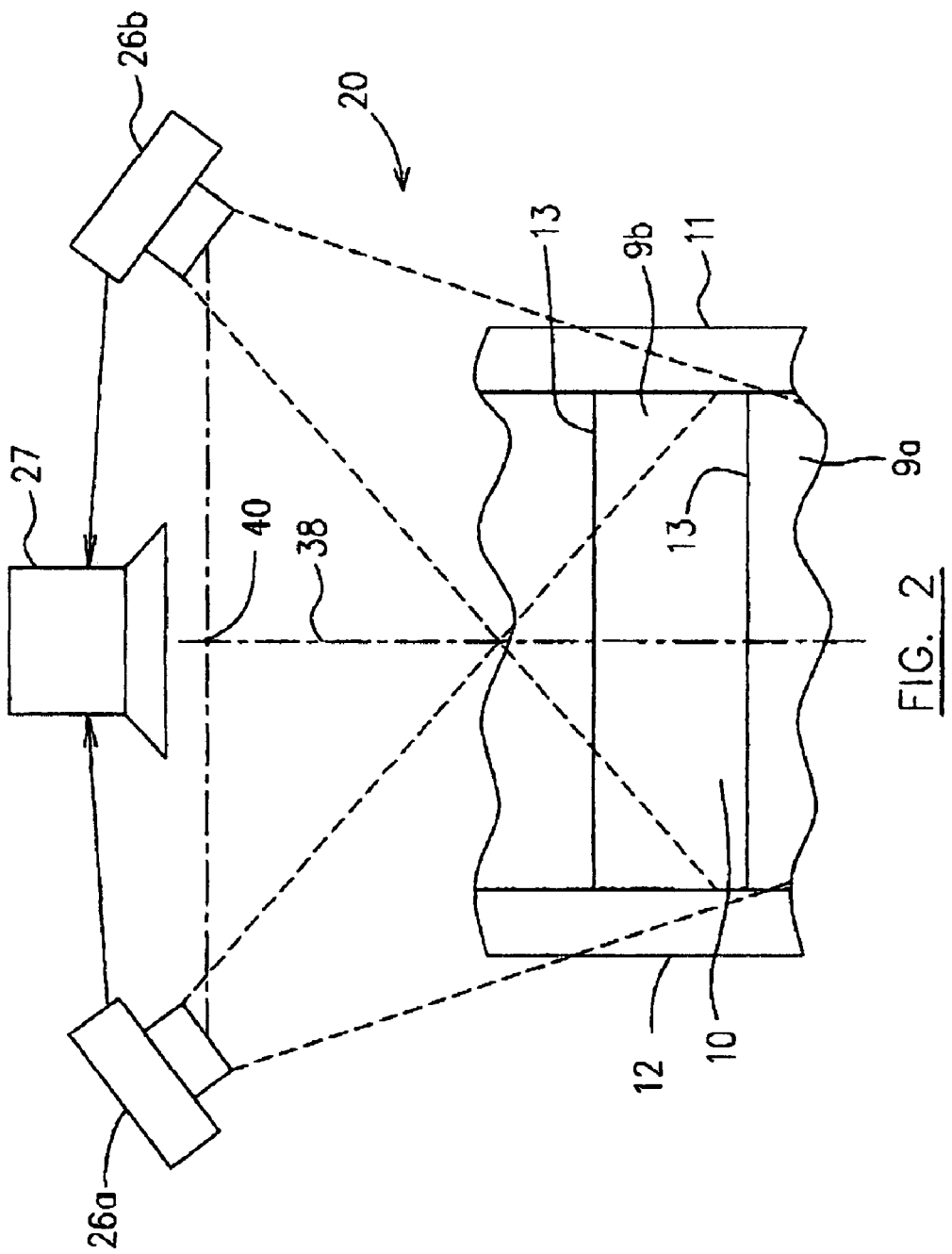
FIG. 2 is a somewhat schematic view of a device according to another embodiment of the present invention taken from a direction parallel to a plane defining the stator vane throat, indicated by the arrow C in FIG. 1.

FIG. 2 is a somewhat schematic illustration of the device 20, in accordance with this embodiment of the present invention, as viewed from a direction indicated by the arrow C in FIG. 1, which is substantially parallel to the plane of the selected throat 10. (Note that, for simplicity of illustration, the curvature of shrouds 11 and 12, and the annular nature of the array of vanes 9 has been omitted.) Thus, in FIG. 2, the plane of the throat 10 represents a straight line superposed with the trailing edge 13 of the vane 9a. The distances between 26a and 26b is known, and preferably invariant. It is preferable to position the detectors 26a, 26b symmetrically about an axis 38 extending through a central point of the throat 10, and perpendicular to the plane of the throat 10. The distance depicted in FIG. 2 is exaggerated for description purposes only, and may be much less (or more) if desired.

This embodiment differs from the first embodiment of the present invention in that both detectors 26a and 26b are used for acquiring size data regarding the selected throat 10, but deviations due to their different vantage points, in conjunction with known information about their relative positions, allows the data they acquire to be analyzed and compared by processor 27 to determine not only image area size but also distance to the subject. For example, the distance determined may be that between the plane of the throat 10 and a reference point, such as point 40 which is the intersection of line 38 and a line (not indicated) extending between the lenses of the respective detectors 26a, 26b. The processor 27 can then used the derived distance data to scale the measured data relative to reference data to provide an accurate (i.e. calibrated) output.

Figure 3:
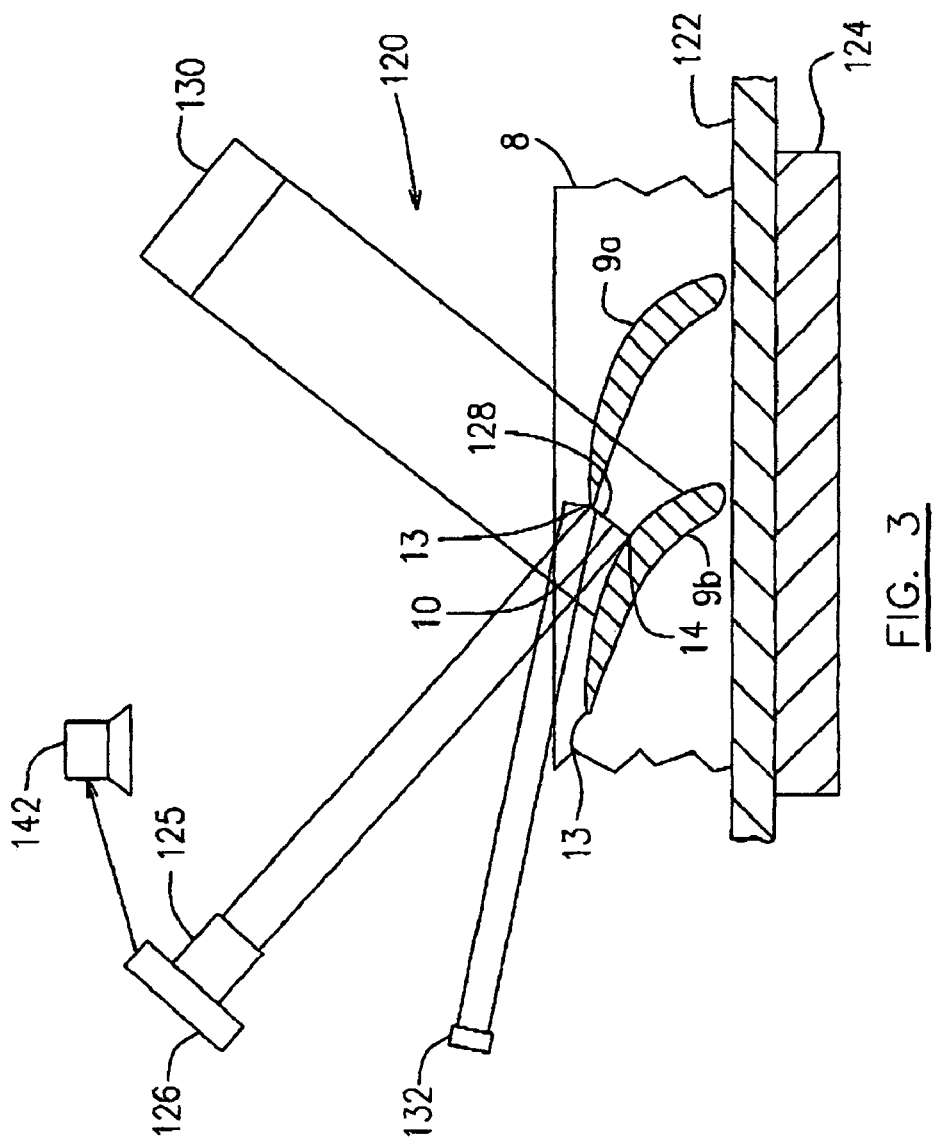
FIG. 3 is an elevational sectional view of a device according to a further embodiment of the present invention including one camera viewing the throat area of the vane ring.
Figure 4:
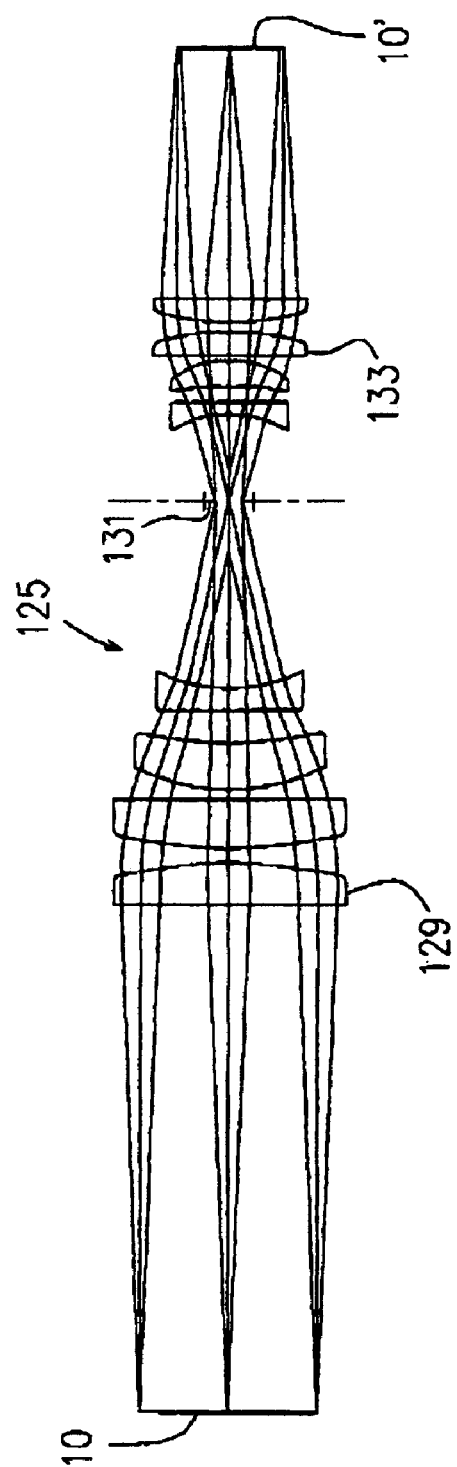
FIG. 4 is a schematic illustration showing a telecentric lens system incorporated into the camera used in the embodiment of FIG. 3.

FIGS. 3 and 4 illustrate a further embodiment of the present invention. A device 120 for measuring the throat area in a vane ring 8, such as a camera, is provided. Component similar in nature and function to the embodiment of FIG. 1 are indicated in FIGS. 3 and 4 by numerals in the 100 series with similar last two digits, and need not be described further. The device 120 includes a radiation detector 126, such as a camera, and includes a telecentric lens system 125. The detector 126 captures size data of the selected throat 10 of the vane ring 8 through the telecentric lens system 125. The telecentric lens system, as will be understood by the skilled reader, is insensitive to variations in viewing distance (as long as the object stay within the depth of field of the lens), and thus can be used to reduce the effect of subject misplacement on measurement data, thereby reducing measurement inaccuracy resulting from minor positional deviations such as those caused by manufacturing tolerances of the vane ring 8 and other small deviations between the desired and actual locations for the throat 10 to be measured.

Telecentric lens systems are known and will therefore be only briefly described here, with reference to FIG. 4. The telecentric lens system 125 includes first and second groups of lens elements 129, 133 positioned at opposite sides of an aperture 131. The aperture 131 blocks all light rays except those in a narrow bundle. There are optimum locations for both the object (the throat 10) and the image 10' where a film or a digital light sensor should be positioned for best image sharpness. If the subject is moved nearer to or farther from the telecentric lens system 125, the size of the image 10' on the sensor will not change. The quality of focus does change, however, if the aperture 131 is made very small, this can be minimized.

The telecentric lens "views" a cylindrical tube of a space of a diameter equal to that of the front lens element 129 of the first lens group. It is thus preferably limited to photographing the subject, e.g. throat 10, the lateral dimensions of which do not exceed the diameter of this front lens element 129. The throat 10 is rendered on the sensor as the image 10' isometrically, such that equal distances, whatever their orientation, are equidistant on the image 10'. Furthermore, parallel lines of the subject (throat 10) are parallel on the image 10'.

The telecentric lens system 125 is telecentric in both image and object space. Moving the object (throat 10) or the light sensor (image 10) relative to the telecentric lens system 125 results in no change of image size. However, a telecentric lens system can be configured much simpler and may simply involve attaching a large diameter positive lens to a detector, in which case the detector is moved forward or back with respect to the positive lens until telecentric conditions are obtained.

It should be noted that modifications and improvements to the above-described embodiments of the present invention may become apparent to those skilled in the art. For example, the above-described embodiments generally include radiation sources positioned at a side of the vane ring 8 where the radiation detector(s) and/or position detector are positioned, usually referred to as a "front radiations" or "front lighting" system. Nevertheless, the present invention is also applicable to a device for measurement which includes radiation sources positioned at an opposite side of the vane ring with respect to the radiation detector(s) and/or position sensor, usually referred to as a "rear lighting" system (such as that described in U.S. Pat. No. 5,517,310, incorporated herein by reference). In the front radiation system, the image of the throat to be measured is a dark portion surrounded by and contrasted with bright areas. In contrast, with a rear radiation system, the image of the throat (given that the specific configuration of the vane ring is suitable for the rear lighting system) is typically a bright portion surrounded by and contrasted with dark areas. Nevertheless, the principle of eliminating or minimizing measurement inaccuracy due to the throat position change, in accordance with the present invention, is equally advantageous to both type of systems. The foregoing description is therefore intended to be exemplary rather than limiting. The scope of the present invention is intended to be limited solely by the scope of the appended claims.

We claim:

1. A device for measuring a throat area of a gas turbine vane ring, the vane ring having an annular array of vanes defining a plurality of individual throats between adjacent vanes of the array, the device comprising:
   an area-determining assembly including at least one primary radiation source for projecting radiation onto a subject vane ring, at least a first radiation detector for sensing radiation indicative of throat area, and a processor for determining throat area from said sensed radiation; and
   a position correction assembly including a position sensor for detecting a present position of the subject vane ring, a comparison apparatus adapted to determine a difference between the present position and a desired reference position, and a correction apparatus adapted to correct the area determined by the area-determining assembly based on any said difference received from the comparison apparatus.

2. The device as claimed in claim 1 wherein the position correction apparatus includes a repositioning apparatus adapted to reposition at least one of the subject and the radiation detector so that the present position equals the reference position to thereby correct the area subsequently determined by the area-determining assembly.

3. The device as claimed in claim 1 wherein the correction apparatus includes a data conversion apparatus adapted to translate the area determined by the area-determining assembly for the subject vane ring in the present position into a calibrated reference area for the subject vane ring in the reference position to thereby correct the area determined by the area-determining assembly.

4. The device as claimed in claim 1 wherein the position sensor comprises said first radiation detector and a second radiation detector, the second radiation detector for sensing radiation indicative of throat area, the second radiation detector being spaced apart a separation distance from the first radiation detector, and wherein the comparison apparatus employs the separation distance and data from the first and second radiation detectors to determine said difference between the present position and the reference position.

5. The device as claimed in claim 1 wherein the position sensor is a camera and the comparison apparatus is a computer.

6. The device as claimed in claim 1 wherein the position correction assembly is adapted to determine horizontal, vertical and angular components of said difference.

7. The device of claim 1 wherein the present and reference positions are relative to a trailing edge of a vane of the subject vane ring.

8. A device for measuring a throat area in a gas turbine engine vane ring, the vane ring having an annular array of vanes defining a plurality of individual throats between adjacent vanes of the array, the device comprising:
   at least one lighting source positioned for lighting a subject vane ring to thereby cast light and shadow to delineate a selected throat of the subject vane;
   a light detector including a telecentric lens, the light detector being positioned to capture an image of the selected throat through the telecentric lens system; and
   a processor for analyzing the image to determine an area of the image.

9. The device as claimed in claim 8 wherein the telecentric lens system comprises a front lens element having a diameter greater than a diagonal size of the selected throat.

10. A device for measuring throat area of a gas turbine engine vane ring, the vane ring having an annular array of vanes defining a plurality of individual throats between adjacent vanes of the array, the device comprising:
    a primary light source disposed in a throat defining position wherein an area of shadow is cast by said primary radiation light on the vane ring initiating in the plane of the selected throat, said area of shadow being surrounded by an area of reflectance to thereby delineate a throat;
    a camera for capturing an image of the throat, said image comprising at least said shadow and said area of reflectance;
    an image analyzer for determining from a dark portion of the image dimensional data indicative of a measurement of throat area of the selected throat;
    a second camera for determining a present position of the vane ring;
    a position comparator for comparing the present position to a desired reference position; and
    adjustment means for adjusting an output measurement of the device to correct for any deviation caused by a difference between the measured present position and desired reference position.

11. The device of claim 10 wherein the adjustment means is adapted to adjust the position of the vane ring to the desired reference position.

12. The device of claim 10 wherein the adjustment means is adapted to adjust the dimensional data such that the output measurement corresponds to a throat area that would have been measured if the vane ring was positioned in the desired reference position.

13. The device of claim 10, wherein the second camera is spaced apart a distance from the first camera, and wherein the position comparator determines said present position based in part on information related to said spaced-apart distance.

14. A method of measuring a throat area in a gas turbine vane ring, the vane ring having an annular array of vanes defining a plurality of individual throats between adjacent vanes, the method comprising:
  a) directing radiation towards the vane ring;
  b) capturing some of said radiation to thereby provide an image of a throat area of the vane ring;
  c) analyzing the image to determine the size of the image;
  d) determining any difference existing between a present position of the throat and a desired reference position of the throat; and
  e) using any said difference existing between the present and reference positions to improve the accuracy of the determined size of the size of the image.

15. The method of claim 14 wherein step e) includes modifying at least one of the present position of the throat, a position of the first radiation detector and the determined dimensional data to reduce measurement inaccuracies related to any difference between the throat present position and the reference position.

16. The method as claimed in claim 14 further comprising adjusting a position of at least one of the radiation detector and the subject vane ring and then repeating at least steps b) and c).

* * * * *